United States Patent [19]

Negishi

[11] Patent Number: 5,051,989
[45] Date of Patent: Sep. 24, 1991

[54] SWITCHING ARRANGEMENT CAPABLE OF SWITCHING BURST TIME PLAN TABLES/CHANNEL ASSIGNMENT PATTERN TABLES OF A SPECIFIC TERRESTRIAL STATION

[75] Inventor: Takeshi Negishi, Tokyo, Japan

[73] Assignee: NEC Corporation, Japan

[21] Appl. No.: 316,698

[22] Filed: Feb. 28, 1989

[30] Foreign Application Priority Data

Mar. 1, 1988 [JP] Japan .................................. 63-47903

[51] Int. Cl.$^5$ .............................................. H04J 3/06
[52] U.S. Cl. ................................ 370/104.1; 370/95.3; 370/95.1
[58] Field of Search .................. 370/95.3, 95.1, 104.1; 455/7, 12, 53

[56] References Cited

U.S. PATENT DOCUMENTS 4,322,845 3/1982 Fennel, Jr. et al. ................. 370/95.3

Primary Examiner—Douglas W. Olms
Assistant Examiner—Wellington Chin
Attorney, Agent, or Firm—Ostrolenk, Faber, Gerb & Soffen

[57] ABSTRACT

In a time division multiple access network comprising a standard station and at least one particular terrestrial station which has a preassigned station address and which is operated in accordance with a current burst time plan and/or channel assignment pattern table, a switching data signal is sent from the standard station to the particular terrestrial station with an indicated preassigned station address, indicated in addition to a switch execution signal. Responsive to the preassigned station address, the particular terrestrial station switches from the current table to a new one. For this purpose, the standard station comprises a station data generation circuit for producing a station address signal representative of the preassigned station address, while the particular terrestrial station comprises a station address decoder which detects the station address signal and switches the tables from the current one to the new one only when the preassigned station address is detected.

4 Claims, 3 Drawing Sheets

SWITCHING ARRANGEMENT CAPABLE OF SWITCHING BURST TIME PLAN TABLES/CHANNEL ASSIGNMENT PATTERN TABLES OF A SPECIFIC TERRESTRIAL STATION

BACKGROUND OF THE INVENTION

This invention relates to a switching arrangement for use in a time division multiple access (TDMA) network comprising a plurality of earth stations.

In conventional time division multiple access network of the type described, communication is made among earth stations through a time division multiple access frame which is divisible into a plurality of channels or time slots. More specifically, each of the earth stations can communicate with the other earth stations through a preselected one of the channels that is preassigned to the earth station under consideration and that is determined in accordance with a burst time plan table and a channel assignment pattern table. Both the burst time plan table and the channel assignment pattern table will simply be called a table hereinafter.

It often occurs that such tables should be changed from an old one to a new one when the earth stations or channels are increased or decreased in number. Heretofore, the new table has been distributed in advance from a standard or reference station to all the other earth stations, which will be called terrestrial stations, in some way or another while the earth stations are kept in operation in accordance with the old table. Each of the new table and the old table may be either a combination of the burst time plan table and the channel assignment pattern table or the burst time plan table alone. For this purpose, a table switching signal must be sent from the standard station to be delivered to all of the terrestrial stations. Supplied with the table switching signal, all of the earth stations substantially simultaneously carry out switching operations, switching of the tables from the old one to the new one without any interruption.

When the switching operations of the tables are simultaneously carried out in all of the earth stations, the standard station must confirm or monitor whether or not the switching operations are correctly carried out in all of the terrestrial stations. Such monitoring operation becomes troublesome and time-consuming as the earth stations increase in number.

Recently, it has often been required to locally increase or decrease a channel capacity, as necessary for communication between specific ones of the earth stations. In order to respond to such a requirement, it has been confirmed by the present inventors that the old table need not entirely be changed to a new one but may only need to be locally or partially changed at a portion of the time division multiple access frame related to the local increase or decrease. In other words, the switching operations of the table need not necessarily be carried out in all the earth stations but may only need to be carried out at the specific earth stations influenced by a change of the channel capacity.

SUMMARY OF THE INVENTION

It is an object of this invention to provide a switching arrangement which is for use in a time division multiple access network and which is capable of locally switching tables, only between specific earth stations.

It is another object of this invention to provide a switching arrangement of the type described, wherein a monitoring operation quickly and readily proceeds after tables are switched from an old one to a new one when the switching arrangement is used in a standard station.

It is still another object of this invention to provide a switching arrangement of the type described, wherein a switching operation of the tables is correctly carried out when the switching arrangement is applicable to each terrestrial station except the standard station.

A time division multiple access network to which this invention is applicable comprises a standard earth station and a plurality of terrestrial station which have individual addresses preassigned thereto and which can communicate with the standard earth station in accordance with current tables determined among the standard earth station and the respective terrestrial stations. According to this invention, the standard earth station comprises address indicating means for indicating each of the terrestrial stations to produce a station address signal representative of each of the individual addresses, switching signal producing means for producing a switching signal representative of switching from each of the current tables to a next table, and transferring means coupled to the indicating and the switching signal producing means for successively transferring the station address signal and the switching signal to selectively make only a single one of the terrestrial stations switch from each of the current tables to the next table of the single one of the terrestrial stations. On the other hand, each of the terrestrial stations is operable in response to the station address signal which is representative of an assigned one of the individual addresses and comprises detecting means responsive to the station address signal for detecting whether or not the station address signal is coincident with the assigned one of the individual addresses, and switching means coupled to the detecting means and responsive to the switching signal for switching from each of the current tables to the next table only when the station address signal is coincident with the assigned one of the individual addresses.

DESCRIPTION OF THE PREFERRED EMBODIMENT

Figure 1:
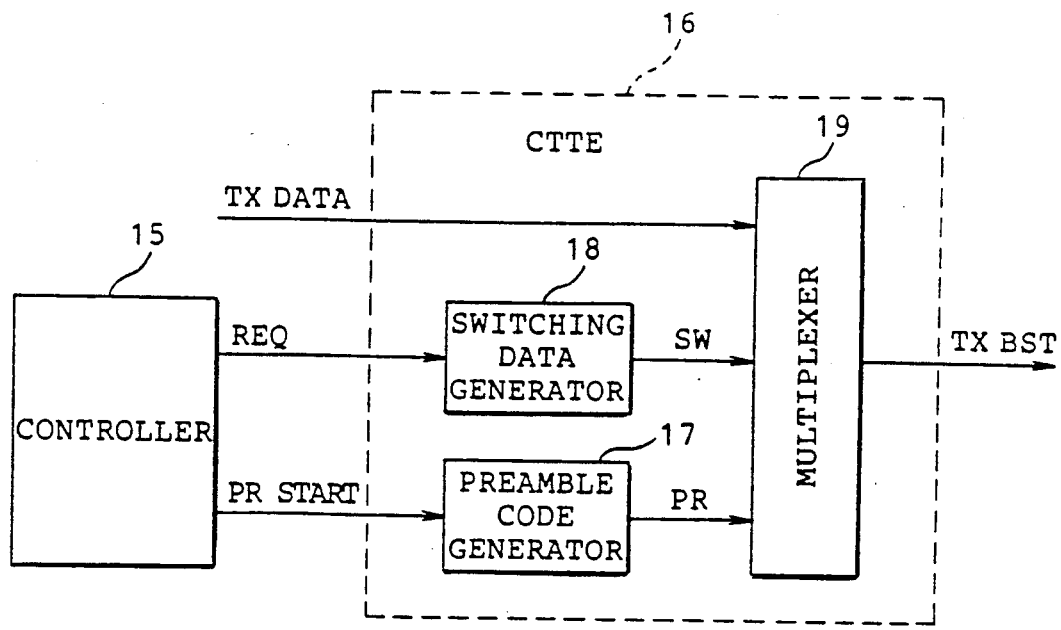
FIG. 1 is a block diagram of a standard station for use in a time division multiple access network to which this invention is applicable.
Figure 2:
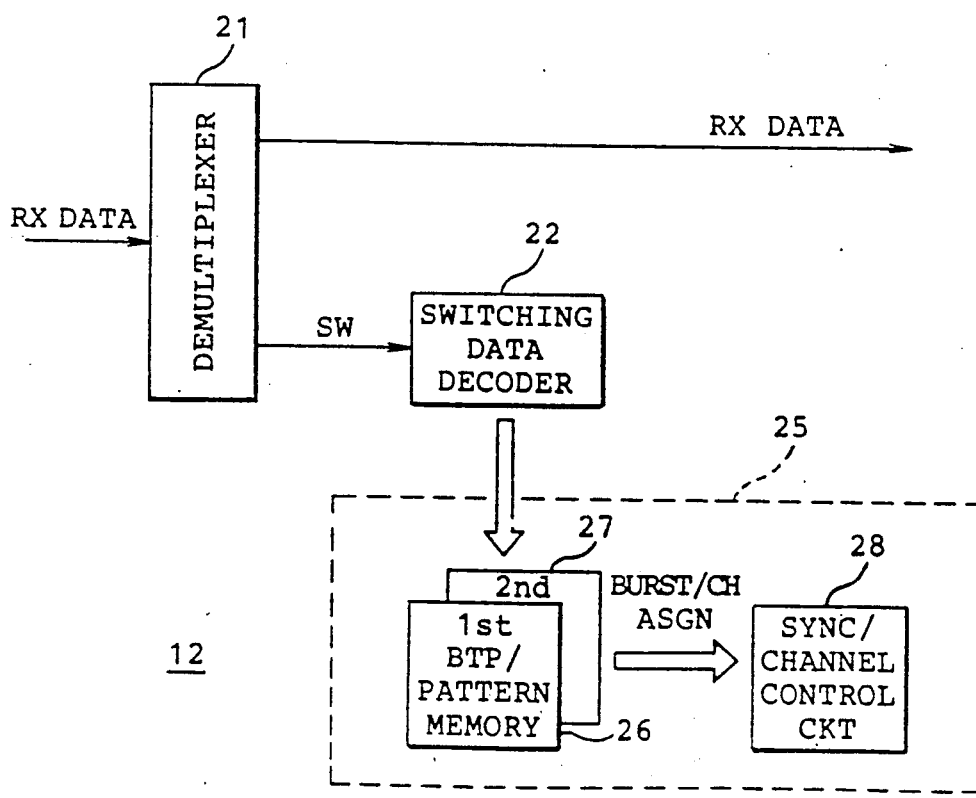
FIG. 2 is a block diagram of a terrestrial station for use in combination with the standard station illustrated in FIG. 1.

Referring to FIGS. 1 and 2, a description will be presented of a time division multiple access network to which this invention is applicable. The time division multiple access network comprises a standard station 11 illustrated in FIG. 1 and a terrestrial station 12 which is illustrated in FIG. 2 and which is illustrated as a representative of a plurality of terrestrial stations controlled by the standard station 11, respectively. In other words, the time division multiple access network may comprise a single station or a plurality of terrestrial stations. In FIGS. 1 and 2, illustrated are only a transmitting side and a receiving side of the standard and the terrestrial stations 11 and 12, respectively, for brevity of description.

It is assumed that the terrestrial station 12 is operated in accordance with a burst time plan (BTP) table and a channel assignment pattern table which may be collectively called a current or old table. Accordingly, the terrestrial station 12 can communicate with the standard station 11 through a selected one of channels preassigned to the terrestrial station 12 by the current table. In addition, it is also assumed that the illustrated network serves to switch from the current table to a new table and that the new table is delivered in advance from the standard station 11 to the terrestrial station 12 through a terrestrial communication network or a satellite communication network in a known manner.

In FIG. 1, the transmitting side of the standard station 11 is provided with a controller 15 and common TDMA terminal equipment (CTTE) 16 for switching the tables from the old one to the new one in a manner to be described later. The CTTE 16 is supplied with a sequence of transmission channel data signals TXDATA from input/output devices or the like (not shown) and is controlled by the controller 15. The illustrated controller 15 supplies the CTTE 16 with both a preamble code start signal (PR START) and a switching request signal (REQ) which indicate a start time instant of a preamble code PR and a request of switching the tables, respectively. The switching request signal (REQ) is a combination of a plurality of request signals, as will become clear later. The controller 15 produces various kinds of control signals in addition to the preamble code start signal (PR START) and the switching request signal (REQ). However, such control signals will not be described any longer because they are not directly concerned with this invention.

The CTTE 16 illustrated in FIG. 1 comprises a preamble code generator 17, a switching data generator 18, and a multiplexer 19.

Supplied with the preamble code start signal (PR START), the preamble code generator 17 produces a preamble code PR which comprises a carrier/bit timing recovery pattern for regeneration of a carrier wave and bit timing of a standard burst, a unique word for frame synchronization, an identification code for identification of the standard station 11, a control data channel (CDC), an order wire channel, and a control information time slot. The control information time slot can be used for delivering each table from the standard station 11 to the terrestrial station 12.

Responsive to the switching request signal (REQ), the switching data generator 18 produces a switching data signal SW indicative of switching the tables from one to another. Specifically, the switching data signal SW comprises a ready data signal produced prior to actual switching so as to put the terrestrial station into a ready state for the switching in advance and an execution data signal indicative of switching the tables.

The preamble code PR and the transmission channel data signal sequence TXDATA are multiplexed by the multiplexer 19 into a transmission burst TXBST which forms the time division multiple access frame and which is sent through a satellite communication network. When the preamble code start signal PR START is given from the controller 15, the switching data signal SW is successively sent from the switching data generator 18 to the multiplexer 19 to be multiplexed into the transmission burst TXBST preceded by the preamble code start signal PR START.

The switching data signal SW may be delivered from the standard station 11 to each terrestrial station 12 through a satellite communication network (not shown).

In FIG. 2, the receiving side of the terrestrial station 12 is supplied with the transmission burst as a sequence of reception data signals RXDATA through a low noise amplifier (not shown) and the like. Responsive to the reception data signal sequence RXDATA, a demultiplexer 21 demultiplexes the reception data signal sequence RXDATA into a sequence of reception channel data signals RXDATA.

When the switching data signal SW is included in the reception data signal sequence RXDATA, the switching data signal SW is demultiplexed and sent to a switching data decoder 22. As a result, the switching data decoder 22 decodes the switching data signal SW into the ready data signal and the execution data signal. Thus, the decoded ready data signal and the decoded execution data signal are sent to a synchronization controller 25.

The synchronization controller 25 comprises first and second pattern/burst time plan (BTP) memories 26 and 27 and a synchronization control circuit 28. The first and the second pattern/BTP memories 26 and 27 are loaded with the current and the new tables, respectively, each of which comprises both the burst time plan table and the channel assignment pattern table.

Prior to reception of the switching data signal SW, the synchronization control circuit 28 is kept in operation in accordance with the current table stored in the first pattern/BTP memory 26. When the switching data signal SW is decoded by the switching data decoder 22, the synchronization controller 25 switches from the first pattern/BTP memory 26 to the second pattern/BTP memory 27. Consequently, the current table is switched to the new table. Thereafter, the synchronization control circuit 28 is operated in response to a channel/burst assignment signal CH/BURST ASSGN produced in accordance with the burst time plan table of the second table.

Figure 3:
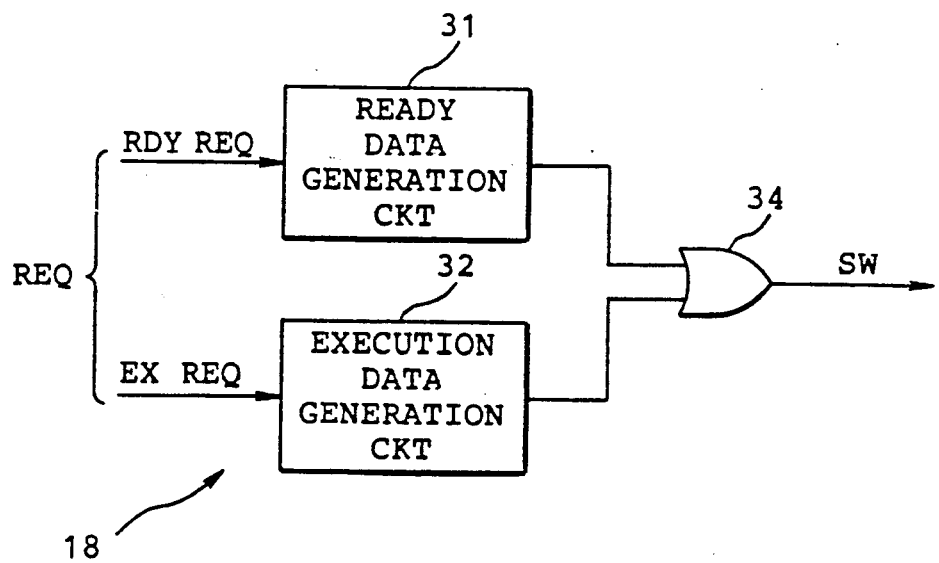
FIG. 3 is a block diagram of a standard station of a conventional time division multiple access network.

Referring to FIG. 3, a conventional switching data generator 18 which is applicable in a conventional TDMA network is also applicable to that illustrated in FIG. 1 and is supplied as the switching request signal REQ with a ready request signal (depicted at RDY REQ) and with an execution request signal (depicted at EX REQ). The illustrated switching data generator 18 comprises a ready data generation circuit 31 and an execution data generation circuit 32 supplied with the ready request signal RDY REQ and the execution request signal EX REQ, respectively. The ready data generation circuit 31 generates the ready data signal necessary to put each terrestrial station into a ready state for switching the tables from one to another. In addition, the execution data generation circuit 32 generates the execution data signal. Both the ready data signal and the execution data signal are successively delivered to the multiplexer 19 (FIG. 1) through an OR gate 34 as the switching data signal SW.

The switching data signal SW is simultaneously delivered from the standard station to all the other terrestrial stations in the conventional TDMA network.

Figure 4:
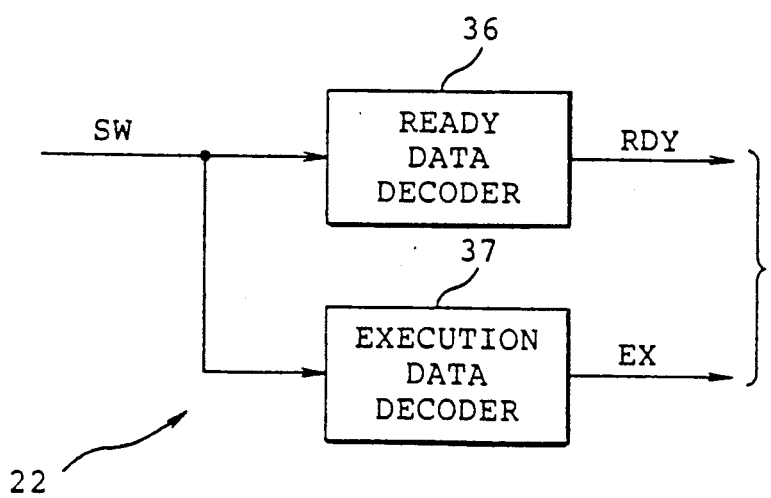
FIG. 4 is a block diagram of a terrestrial station that can communicate with the standard station illustrated in FIG. 2 in the conventional time division multiple access network.

Referring to FIG. 4, a conventional switching data decoder 22 which is usable in the conventional TDMA network can also be used in that illustrated in FIG. 2 and is supplied with the switching data signal SW received by each conventional terrestrial station. The illustrated switching data decoder 22 comprises a ready data decoder 36 and an execution data decoder 37 both of which are operable in response to the switching data signal SW received. The ready and the execution data decoders 36 and 37 decode the switching data signal SW into the ready data signal (depicted at RDY) and the execution data signal (depicted at EX), respectively. Both the ready data signal RDY and the execution data signal EX are sent to the synchronization circuit 25 (FIG. 2) to switch from the current table to the new one.

With this structure, the tables are simultaneously switched in all earth stations which include the standard station and the other terrestrial stations. This shows that it is difficult to selectively switch the tables only between specific ones of the earth stations. Such simultaneous switching of the tables presents no problem in an international communication network. More specifically, the tables are switched once in several months or so and there is a long time to spare before switching of the tables. Therefore, it is possible to preliminarily prepare new tables for all the earth stations.

On the other hand, it seems that such tables should be frequently switched in domestic or local communication networks. However, it is difficult to respond to a requirement of such frequent switching in the tables. Moreover, with the systems described above, the tables must be forcibly switched even in earth stations wherein switching is actually unnecessary. This brings about not only a reduction of reliability in switching of the tables, but also failure of switching, as pointed out in the preamble of the instant specification.

Figure 5:
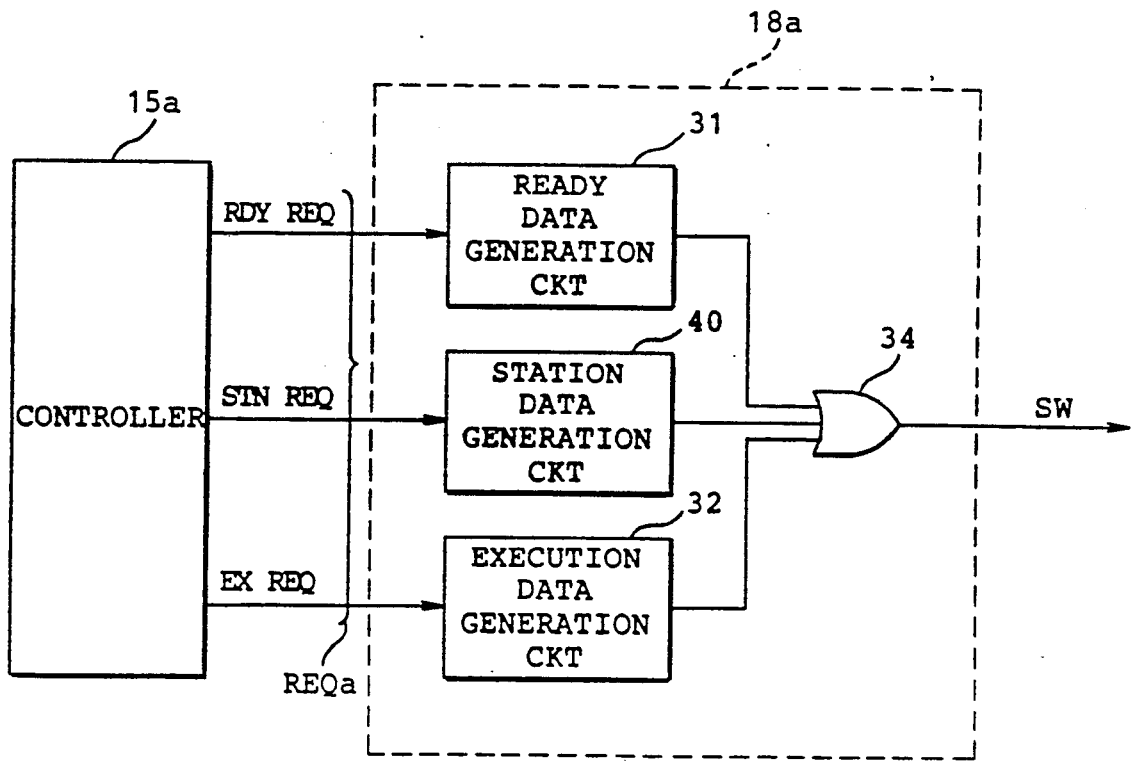
FIG. 5 is a block diagram of a switching arrangement of a standard station according to a preferred embodiment of this invention.

Referring to FIG. 5, a switching arrangement according to a preferred embodiment of this invention is for use in a standard station 11 (FIG. 1) and is operable as the switching data generator 18 illustrated in FIG. 1. In this connection, the switching arrangement is depicted at 18a. The illustrated switching arrangement 18a is similar in structure and operation to the switching data generator 18 shown in FIG. 3 except that a station request signal STN REQ is supplied to the switching arrangement 18a from a controller depicted at 15a to specify a station wherein the tables should be switched from one to another. For this purpose, the station request signal STN REQ includes a station address preassigned to the station in question. It is readily possible to produce such a station request signal STN REQ in the controller 15a in a known manner. Therefore, description will be omitted in connection with the controller 15a.

Now, the switching arrangement 18a comprises a station data generation circuit 40 supplied with the station request signal STN REQ in addition to the ready data generation circuit 31 and the execution data generation circuit 32 both of which are similar to those illustrated in FIG. 3. The station data generation circuit 40 produces a station address signal representative of a particular one of the terrestrial station addresses to be switched.

The station address signal is produced by the station data generation circuit 40 after or simultaneously with production of the ready data signal by the ready data generation circuit 31 and is followed by the execution data signal generated by the execution data generation circuit 32. The ready data signal, the station address signal, and the execution data signal are thus successively sent through the OR gate 34 as the switching data signal SW to the multiplexer 19 (FIG. 1).

As mentioned before, the station data generation circuit 40 may be referred to as an address indicating circuit for indicating the particular terrestrial station. The execution data signal specifies an actual switching timing of switching the tables from one to another and may be called a switching signal. The OR gate 34 is operable to successively or simultaneously transferring the station address signal and the switching signal and may be named a transferring circuit. At any rate, the switching data signal SW is delivered in the form of a transmission burst to the particular terrestrial station to selectively switch the tables from one to another.

Figure 6:
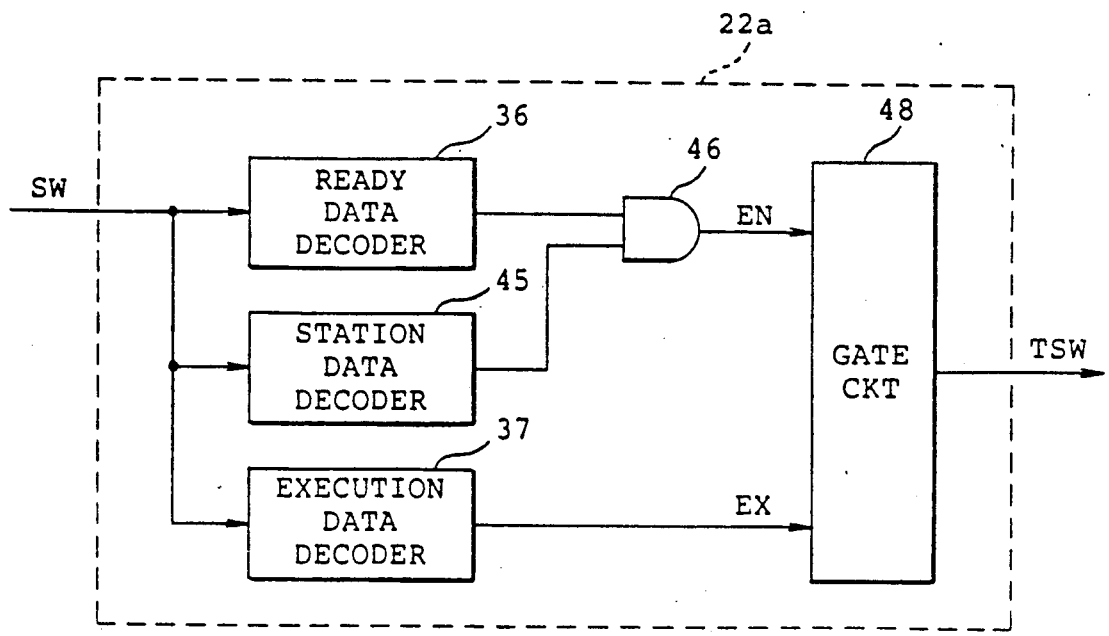
FIG. 6 is a block diagram of a switching arrangement of a terrestrial station that can communicate with the standard station illustrated in FIG. 5.

Referring to FIG. 6 together with FIG. 2, a switching arrangement according to the preferred embodiment of this invention is for use in a particular terrestrial station and is operable as the switching data decoder 22 of the particular terrestrial station 12 (FIG. 2). In this connection, the switching arrangement of FIG. 6 is depicted at 22a. The illustrated switching arrangement 22a is similar in structure and operation to the switching data decoder 22 shown in FIG. 4 except that a station data decoder 45, an AND gate 46, and a gate circuit 48 are included in the switching arrangement together with the ready data decoder 36 and the execution data decoder 37 both of which are similar to those illustrated in FIG. 4. The switching data signal SW is received by the particular terrestrial station 12 and is delivered to the ready data decoder 36, the execution data decoder 37, and the station data decoder 45 in parallel. It is mentioned here that the particular station address is assumed to be preassigned to the particular terrestrial station illustrated.

With this structure, both the ready data signal and the execution data signal are decoded by the ready data decoder 36 and the execution data decoder 37 in the manner illustrated in FIG. 4. On the other hand, the station data signal of a logic "1" level is decoded by the station data decoder 45 when the station address signal received is coincident with the preassigned station address. Responsive to the station data signal decoded and the ready data signal, the AND gate 46 produces an enable signal EN of the logic "1" level along with the ready data signal of the ready data decoder 36. On the other hand, the enable signal EN does not appear from the AND gate 46 when the station data signal is not coincident with the particular station address. The enable signal EN and the execution data signal EX are supplied to the gate circuit 48. The gate circuit 48 sends a table switching signal TSW to the synchronization controller 25. Thus, the table switching signal TSW is produced only when the station address signal is coincident with the particular station address preassigned to the particular terrestrial station 12.

With this structure, it is possible to switch the tables from an old one to a new one only in a specific one of the terrestrial stations. In other words, the tables can be selectively switched only in a specific terrestrial station indicated by a standard station.

Each of the switching arrangements 18a and 22a illustrated in FIGS. 5 and 6 may be implemented by a microprocessor which has a sufficient processing speed.

According to this invention, switching of tables can be carried out in a selected one of the terrestrial stations. This means that probability of failure in the switching can be lowered as compared with simultaneous switching carried out in the conventional network and that reliability required for a communication system is improved in the satellite communication network. In addition, new tables may be prepared only for specific terrestrial stations for which table switching is desired, and can therefore be quickly made up. In other words, the tables may be frequently changed.

What is claimed is:

1. In a time division multiple access network comprising a standard earth station and a plurality of terrestrial stations, each of which has an address preassigned thereto and can communicate with said standard earth station in accordance with a table determined between said standard earth station and each terrestrial station, said table including a burst time plan table and a channel assignment pattern table, the improvement for updating the table in at least one of said terrestrial stations, wherein said standard earth station comprises:
   address producing means for producing a station address signal representative of the address which is assigned to a particular terrestrial station in which said table is to be updated;
   switching signal producing means for producing a switching signal representative of updating said table; and
   transferring means coupled to said address producing means and said switching signal producing means for successively transferring said station address signal and said switching signal to at least said particular terrestrial station, to selectively update only the table of said particular terrestrial station.

2. A time division multiple access network as claimed in claim 1, wherein said standard station further comprises:
   ready signal generating means for generating a ready signal prior to production of said switching signal;
   said transferring means also being coupled to said ready signal generating means and supplied with said ready signal, which is sent together with said station address signal at least to said particular terrestrial station.

3. In a time division multiple access network comprising a standard earth station and a plurality of terrestrial stations which have individual addresses, respectively, and which can communicate with said standard earth station in accordance with tables determined among said standard earth station and said plurality of the terrestrial stations, each of said tables including a burst time plane table and a channel assignment pattern table, the improvement for updating the table in at least one of said terrestrial stations, wherein each of said terrestrial stations is operable in response to a station address signal which is representative of an assigned one of said individual addresses and which is followed by a switching signal representative of updating said tables, and comprises:
   detecting means responsive to said station address signal for detecting whether or not said station address signal is coincident with said assigned one of the individual addresses; and
   switching means coupled to said detecting means and responsive to said switching signal for updating said table in a given terrestrial station only when said station address signal is coincident with said assigned one of the individual addresses assigned to said given terrestrial station.

4. In a time division multiple access network comprising a standard earth station and a plurality of terrestrial stations which have individual addresses preassigned thereto and which can communicate with said standard earth station in accordance with tables determined among said standard earth station and the respective terrestrial stations, each of said tables including a burst time plane table and a channel assignment pattern table, the improvement for updating the table in at least one of said terrestrial stations, wherein said standard earth station comprises:
   address producing means for producing a station address signal representative of the address which is assigned to a particular terrestrial station in which said table is to be updated;
   switching signal producing means for producing a switching signal representative of updating said table; and
   transferring means coupled to said address producing means and said switching signal producing means for successively transferring said station address signal and said switching signal to at least said particular terrestrial station, to selectively update only the table of said particular terrestrial station;
   each of said terrestrial stations being operable in response to said station address signal which is representative of an assigned one of said individual addresses and comprising:
   detecting means responsive to said station address signal for detecting whether or not said station address signal is coincident with said assigned one of the individual addresses; and
   switching means coupled to said detecting means and responsive to said switching signal for updating said table in a given terrestrial station only when said station address signal is coincident with said assigned one of the individual addresses assigned to said given terrestrial station.

* * * * *